(12) United States Patent
Lehmann et al.

(10) Patent No.: US 7,260,929 B2
(45) Date of Patent: Aug. 28, 2007

(54) SECONDARY AIR DELIVER DEVICE FOR AN INTERNAL COMBUSTION ENGINE

(75) Inventors: Hans-Georg Lehmann, Esslingen (DE); Martin Schlegl, Rudersberg (DE); Holger Stark, Allmersbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/344,967

(22) Filed: Jan. 31, 2006

(65) Prior Publication Data

US 2006/0150618 A1 Jul. 13, 2006

Related U.S. Application Data

(63) Continuation-in-part of application No. PCT/EP04/08238, filed on Jul. 23, 2004.

(30) Foreign Application Priority Data

Aug. 1, 2003 (DE) ................ 103 35 260

(51) Int. Cl.
*F01N 3/00* (2006.01)
(52) U.S. Cl. ............... 60/289; 60/280; 60/605.2
(58) Field of Classification Search ........... 60/280, 60/289, 290, 293, 605.2, 605.1; 415/121.2; 123/565
See application file for complete search history.

(56) References Cited

U.S. PATENT DOCUMENTS 3,303,994 A 2/1967 Morooka
4,147,467 A * 4/1979 Leicht et al. ............... 415/196
4,181,466 A * 1/1980 Owen .......................... 415/204
4,254,617 A * 3/1981 Papsdorf ................... 60/39.465
4,534,173 A * 8/1985 Tsukamoto .................. 60/606
4,702,219 A * 10/1987 Tadokoro et al. ......... 123/559.1
5,720,595 A * 2/1998 Avny ........................... 416/180
6,094,909 A * 8/2000 Weber et al. .................. 60/280
6,334,436 B1 * 1/2002 Paffrath et al. ............. 123/564
6,425,743 B1 7/2002 Fischer
6,817,173 B2 * 11/2004 Paffrath et al. ............... 60/293
6,883,323 B2 * 4/2005 Hummel ....................... 60/606
7,162,865 B2 * 1/2007 Weigand et al. .............. 60/289
2003/0172913 A1 * 9/2003 Hummel et al. ......... 123/559.1

FOREIGN PATENT DOCUMENTS

| DE | 4418051 | * 12/1995 |
| DE | 19 41 467 | 4/1998 |
| DE | 199 37 781 | 2/2001 |
| GB | 466 203 | 5/1937 |
| WO | WO 01/59273 | 8/2001 |
| WO | WO 02/27164 | 4/2002 |

* cited by examiner

*Primary Examiner*—Thomas Denion
*Assistant Examiner*—Diem Tran
(74) *Attorney, Agent, or Firm*—Klaus J. Bach (57) ABSTRACT

In a secondary air delivery device for an internal combustion engine comprising a secondary air charger with a compressor and a turbine which is driven by the vacuum generated in the engine intake duct and which drives the compressor that delivers secondary air to the engine exhaust duct, wherein the engine intake air duct includes an air filter for filtering the air supplied to the engine, a separate air filter structure is provided for filtering the air supplied to the compressor and to the turbine which air filter structure is accommodated in the housing of the secondary air charger.

16 Claims, 8 Drawing Sheets

SECONDARY AIR DELIVER DEVICE FOR AN INTERNAL COMBUSTION ENGINE

This is a Continuation-In-Part Application of International Application PCT/EP2004/008238 filed Jul. 23, 2004 and claiming the priority of German application 103 35 260.0 filed Aug. 01, 2003.

BACKGROUND OF THE INVENTION

The invention relates to a secondary air delivery device for an internal combustion engine including a secondary air charger with a compressor connected to a turbine which is driven by the vacuum present in the engine intake duct, the compressor delivering secondary air to the engine exhaust gas.

A secondary air delivery device for an internal combustion engine is disclosed in DE 199 37 781 A1 in which both a compressor and a turbine are connected via separate lines 22, 33 to an intake duct 11 downstream of an air filter 12 for the internal combustion engine. The extraction point for the clean air for the compressor and for the turbine is located downstream of the air filter for the intake duct. Due to the lines 22, 33, there is only slight variability of the installation location for the secondary air charger normally composed as a construction unit including a compressor and a turbine, since very long feed lines may possibly result, depending on the proportions by volume of the internal combustion engine. However, such long feed lines entail the risk that air contaminated by leakages can pass into the secondary air charger. In addition, the provision of long feed lines is complicated and costly.

SUMMARY OF THE INVENTION

In a secondary air delivery device for an internal combustion engine comprising a secondary air charger with a compressor and a turbine which is driven by the vacuum generated in the engine intake duct and which drives the compressor which delivers secondary air to the engine exhaust duct, wherein the intake duct includes an air filter for filtering the air supplied to the engine, a separate air filter structure is provided for filtering the air supplied to the compressor and to the turbine which air filter structure is accommodated in the housing of the secondary air charger.

The arrangement according to the invention has the advantage that a compact component is provided which, by the omission of feed lines to the intake duct, permits the selection of a wide variety of installation locations or has high variability of the installation location. In addition, the omission of the lines to the intake duct results in increased safety against the influx of unfiltered air.

The use of a common, push-in air filter element results in simple fitting of the secondary air charger. Furthermore, due to the arrangement of the bearings for the shaft of the secondary air charger, obstruction of the shaft can be reliably ruled out.

The invention will become more apparent from the following description of exemplary embodiments thereof on the basis of the accompanying drawings.

DESCRIPTION OF THE EXEMPLARY EMBODIMENTS

Figure 1:
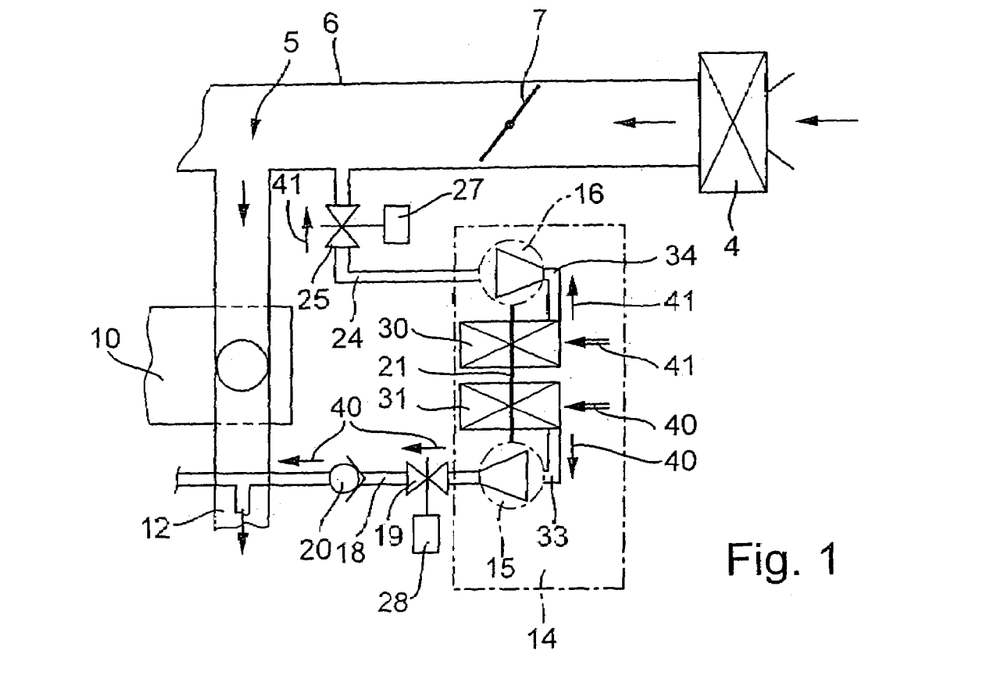
FIG. 1 shows schematically a secondary air delivery device according to a first exemplary embodiment of the invention.

FIG. 1 shows schematically a simplified functional secondary air delivery device for an internal combustion engine 10. Air is fed to the internal combustion engine 10 via an air filter 4, this air passing further into an intake duct 5 which comprises an intake pipe 6 and a throttle valve 7. The air flowing from the air filter, this air being controlled by the throttle valve 7, passes to cylinders (not shown in any more detail) of the internal combustion engine 10. The exhaust gases given off by the internal combustion engine 10 pass in a known manner into an exhaust gas region 12, consisting of an exhaust manifold and exhaust gas system. The secondary air delivery device has a secondary air charger 14 (defined by dot-dash line in FIG. 1) which has a compressor 15 and a turbine 16. The compressor 15 delivers air via a secondary air line 18 into the exhaust gas region 12 of the internal combustion engine 10. In the secondary air line 18, which opens into the exhaust gas region, for example downstream of the exhaust manifold, a first control valve 19, for example, is arranged downstream of the compressor 15, and a check valve 20, for example, is arranged further downstream.

The compressor 15 is connected to the turbine 16 via a shaft 21 and is driven by the turbine 16. In the process, the latter utilizes the pressure difference, produced by the throttle valve 7, in the intake duct 5 relative to the environment by extracting intake air through a feed line 24, e.g. downstream of the throttle valve 7. The feed line 24 leads to the turbine 16. To control the output which is delivered by the turbine 16 and results from the mass flow in the feed line 24 or the prevailing vacuum in the intake pipe 6, a second control valve 25 is provided in the feed line 24. Both control valves 19, 25 can be actuated via corresponding actuators 27, 28. According to the invention, as shown in FIG. 1, provision is now made for separate respective air filter elements 30, 31 to be provided for the turbine 16 and the compressor 15, respectively, in order to provide clean air for the compressor 15 and for the turbine 16. Both air filter elements 30, 31 are therefore provided in addition to the air filter 4, a factor which enables corresponding feed lines to the air filter 4 or the intake pipe 6 to be dispensed with. As shown by arrows 40, the air drawn in by the compressor 15 flows via the air filter element 31 and a line section 33 to the compressor 15, where the air is correspondingly compressed and pumped into the secondary air line 18. The quantity of secondary air is controlled by the second control valve 25, the check valve 20 preventing a backflow from the exhaust gas region 12 of the internal combustion engine 10.

In particular during the starting phase of the internal combustion engine 10, the turbine 16 provides for additional air to be introduced on the exhaust gas side, as a result of which hydrocarbons and carbon monoxides in the exhaust gas are oxidized, which leads to an improvement in the exhaust gas values of the internal combustion engine 10.

As the arrows 41 show, when the second control valve 25 is open, the air drawn in by the internal combustion engine flows from the environment via the air filter element 30 into a line section 34 and then further to the turbine 16 and from the latter via the feed line 24 into the intake pipe 6. Depending on the position of the second control valve 25, air drawn in by the internal combustion engine 10 is drawn in to a greater or lesser degree via the turbine 16, so that a corresponding output of the turbine 16 is delivered to the compressor 15. The air flowing in via the turbine 16 and thus its output to the compressor 15 can be controlled via the second control valve 25. As FIG. 1 shows, provision is made according to the first exemplary embodiment both for an air filter element 31 to be assigned to the compressor 15 and for an air filter element 30 to be assigned to the turbine 16. The air filter elements 30 and 31 separately assigned in each case enable corresponding feed lines to the clean air side downstream of the air filter 4 to be completely dispensed with. In addition to the compact design of the secondary air charger 14, this permits high variability, so that it can be provided at different points of the internal combustion engine 10.

Figure 2:
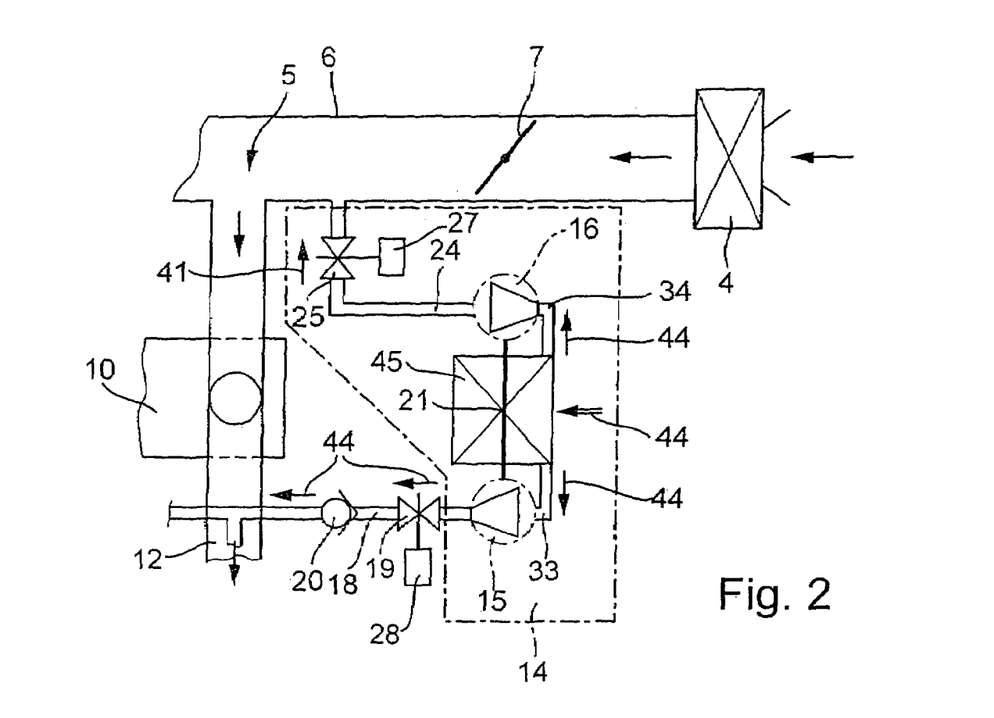
FIG. 2 shows schematically the secondary air delivery device according to a second exemplary embodiment.

FIG. 2 shows a second exemplary embodiment according to the invention, in which all the components which are identical or have the same effect are identified by the same reference numerals. In a modification to the first exemplary embodiment according to FIG. 1, a common air filter element 45 is provided instead of the two separate air filter elements 30, 31, this common air filter element 45 being assigned to both the compressor 15 and the turbine 16. The provision of a common air filter element 45 for the compressor 15 and the turbine 16 offers further advantages with regard to the configuration of the secondary air charger 14 in respect of its type of construction and the number of its components. As the arrows 44 show, the air required by the secondary air charger 14 flows via the common air filter element 45 and splits up into a partial flow to the compressor 15 and into a partial flow to the turbine 16. The common air filter element 45 may have a different perforation or density distribution, adapted to the compressor 15 or the turbine 16, of its filter region, since the air mass flows entering the compressor 15 and the turbine 16, respectively, may differ in order thus to be able to achieve an optimum adaptation or filter effect with the lowest possible pressure loss. It is also possible to provide a partition in the interior of the common air filter element 45, so that there are two separate regions which have filter regions of different configuration.

Figure 3:
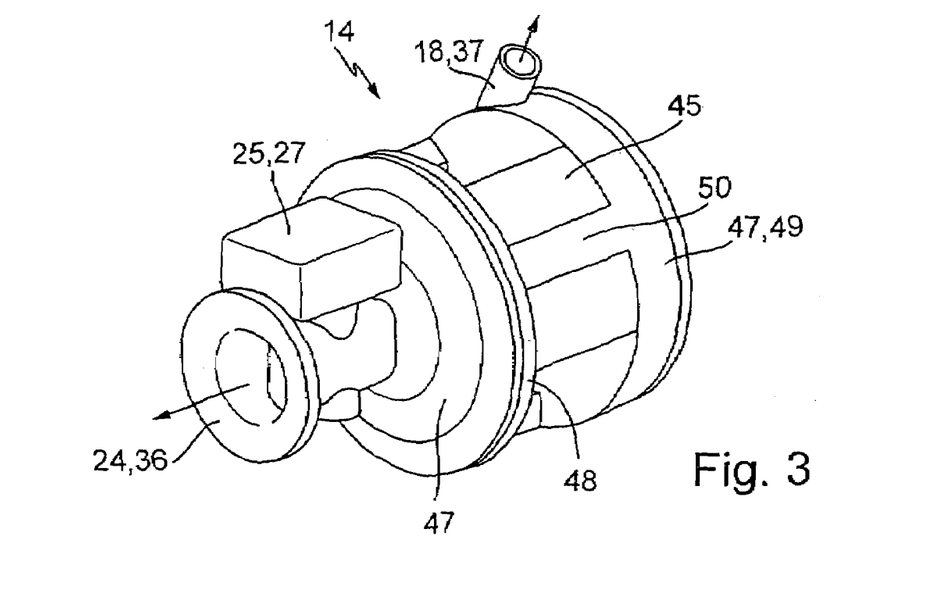
FIG. 3 is a perspective illustration of a secondary air charger with integrated control valve.
Figure 4:
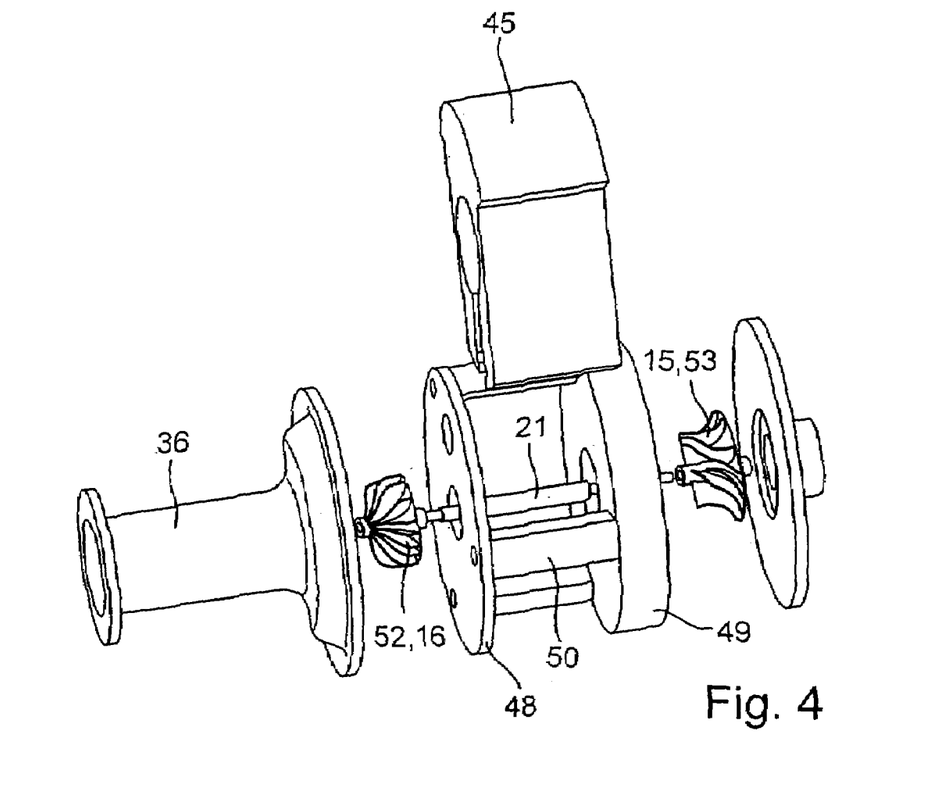
FIG. 4 shows an exploded illustration of the secondary air charger without integrated control valve.
Figure 5:
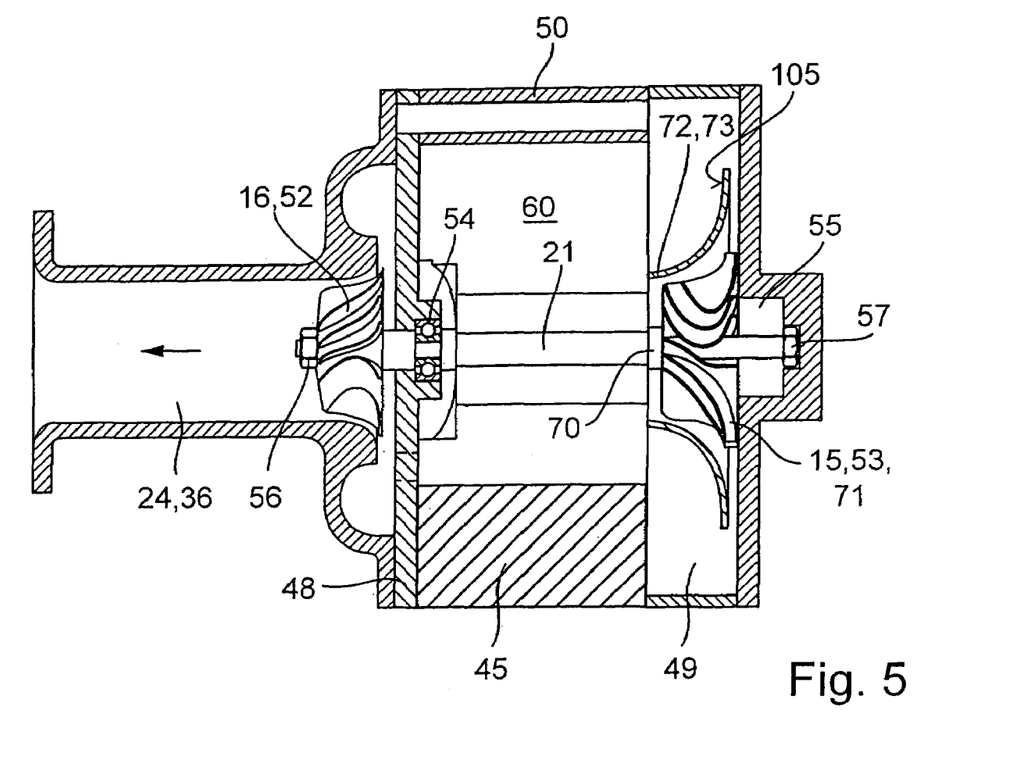
FIG. 5 is a sectional view of the secondary air charger shown in FIG. 4.

The design of the secondary air charger 14 for such a common air filter element 45 is shown in more detail in the further FIGS. 3 to 5. Thus, FIG. 3 shows a perspective illustration of a secondary air charger 14 in which the second control valve 25, e.g. designed in the form of a rotary slide valve, is additionally integrated in a housing 47 of the secondary air charger 14. The housing 47 of the secondary air charger 14 has a frame structure which is essentially composed of two side elements—a first side element 48 and a second side element 49—and also a plurality of axial struts 50. As shown in more detail by FIG. 4, the shaft 21 of the secondary air charger 14 extends through both side elements 48, 49, a turbine wheel 52 of the turbine 16 adjoining the side element 48 shown on the left, and a compressor wheel 53 of the compressor 15 adjoining the right-hand side element 49. In the assembly according to FIG. 5, the turbine wheel 52 is located outside a fitting space 60 defined by both side elements 48, 49, and the compressor wheel 53 is located inside said fitting space 60. The connection to the feed line 24 to the intake duct 5 is effected via a funnel-shaped connection piece 36. As shown in FIG. 3, the second control valve 25, for example, is accommodated in the connection piece 36, the actuator 27 (FIG. 3) lying outside the connection piece 36. However, a design of the connection piece 36 with integrated second control valve 25 is also possible, as FIG. 3 shows, the second control valve 25 then being provided separately, i.e. outside the secondary air charger 14. The air compressed by the compressor wheel 53 is delivered into the secondary air line 18 via a connection 37 (shown in FIG. 3) at the second side element 49.

As shown in more detail by FIG. 5, a bearing arrangement 54 of the turbine wheel 52 is provided in the region of the side wall 48 shown on the left, whereas a bearing arrangement 55 of the compressor wheel 53, e.g. by means of a ball bearing, is provided essentially outside the side wall 49 shown on the right. A relatively large bearing spacing for both ball bearings 54 and 55 is thus advantageously obtained.

The compressor wheel 53 and the turbine wheel 52 are screwed to the shaft 21 via nuts 56, 57. It is also possible to provide a thread on the compressor wheel 53 or on the turbine wheel 52 or to integrate said thread therein, so that simple screwing onto the shaft 21 can be effected by means of the wheels 52, 53. Compared with the conventional arrangement as it is known, for example, in the exhaust gas turbocharger sector (see for example DE 196 15 237 C2), the compressor wheel 53 is fitted in such a way as to be rotated by 180°, which means that the blading of the compressor wheel 53 points inward, i.e. toward the fitting space 60 between the side elements 48, 49. The spiral of the compressor wheel 53 is designed so as to be opposed to the spiral of the turbine wheel 52. The compressor wheel 53 is designed as a radial-flow wheel or as a radial-flow compressor. However, a design as an axial-flow wheel or as an axial-flow compressor is also possible. The turbine wheel 52 is designed as a radial-flow wheel or as a radial-flow turbine. However, a design as an axial-flow wheel or as an axial-flow turbine is also possible.

Figure 6:
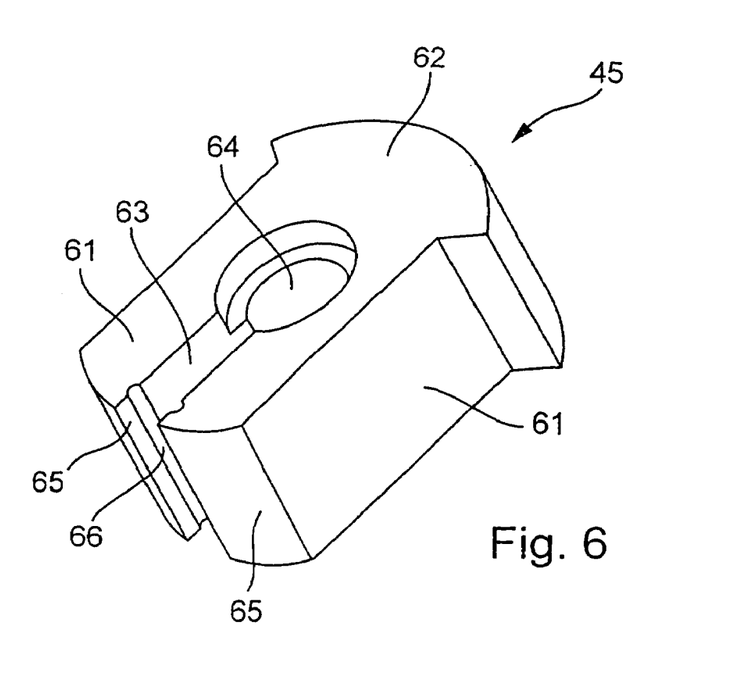
FIG. 6 is a perspective illustration of an air filter element for the secondary air charger.

The fitting space 60 provided between the side elements 48, 49 serves to accommodate the air filter element 45. As FIG. 6 shows, the air filter element 45 has a horseshoe shape or U shape formed in one piece of two side parts 61 and a curved connecting part 62. Cut out between the side parts 61 is a slot 63, which merges approximately in the center of the air filter element 45 into a recess 64, which is preferably round and has a larger diameter than the shaft 21. End sections 65 of the side parts 61 each have a groove 66, these grooves 66 being provided opposite one another on that side of the side parts 61 which faces the slot 63 and running in the axial direction of the shaft 21. When the air filter element 45 is being fitted, it is put into the fitting space 60 and, guided by the side elements 48, 49, is inserted until latching lugs (not shown in any more detail) provided in the frame element or on the housing 47 in a corresponding manner to the grooves 66 engage in a latching manner in the grooves 66. The slot 63 and the recess 64 are designed in such a way that sufficient distance around the rotating shaft 21 is obtained, this distance ruling out contact with or damage to the shaft. Alternatively, it is also conceivable to secure the air filter element 45 to the housing 47 or to the frame via appropriate clips or screws. When installed, the air filter element 45 fills the fitting space 60.

Figure 7:
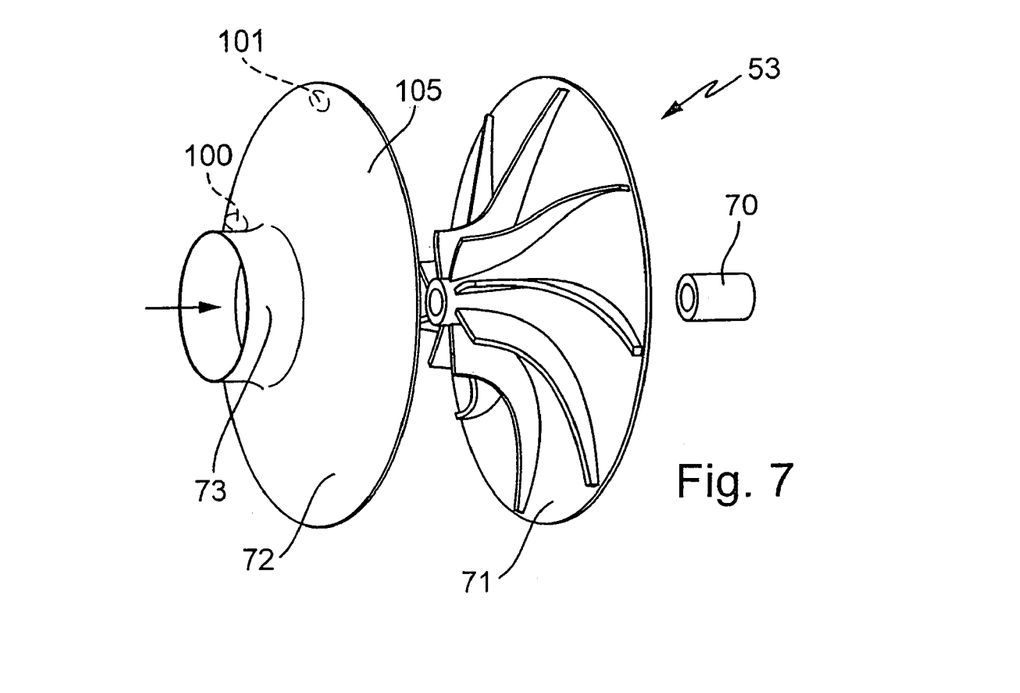
FIG. 7 shows an exploded illustration of a compressor wheel of the secondary air charger.
Figure 8:
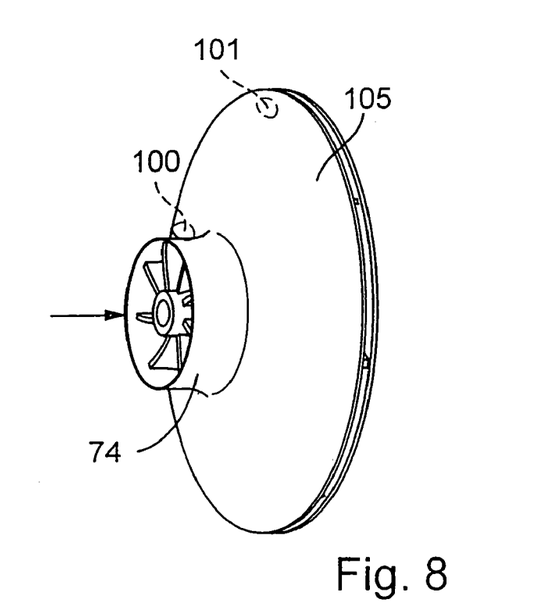
FIG. 8 is a perspective view of the compressor wheel according to FIG. 7.
Figure 9:
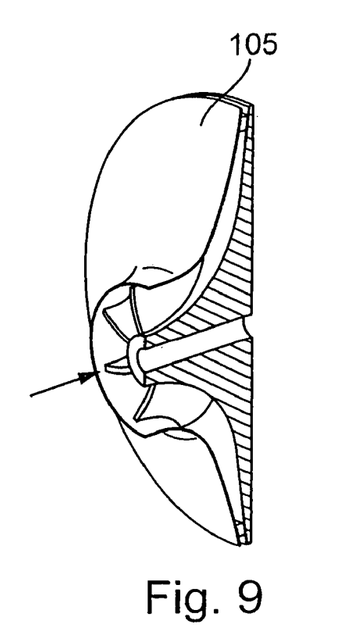
FIG. 9 shows a partial sectional illustration of the compressor wheel according to FIG. 8.
Figure 14:
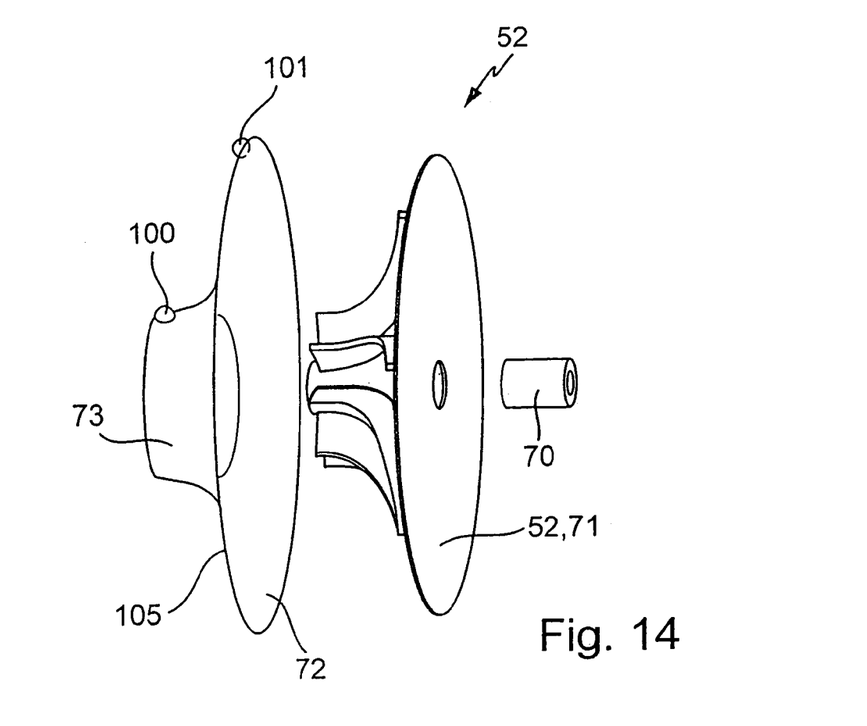
FIG. 14 shows a perspective exploded illustration of a turbine wheel according to a further embodiment.
Figure 15:
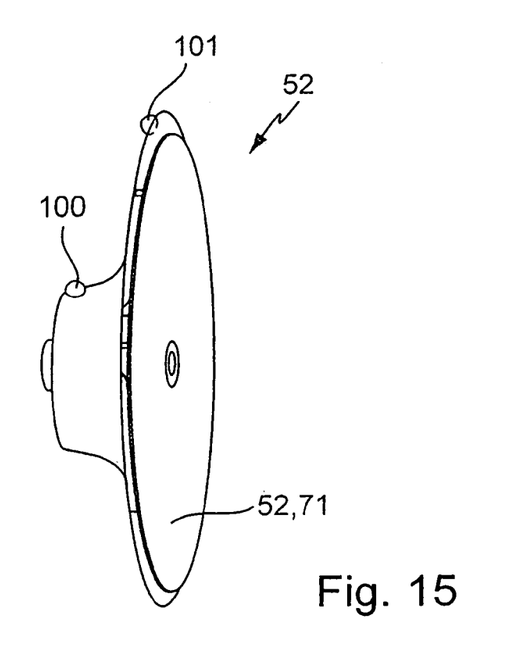
FIG. 15 shows a perspective assembly illustration of the turbine wheel according to FIG. 14.
Figure 16:
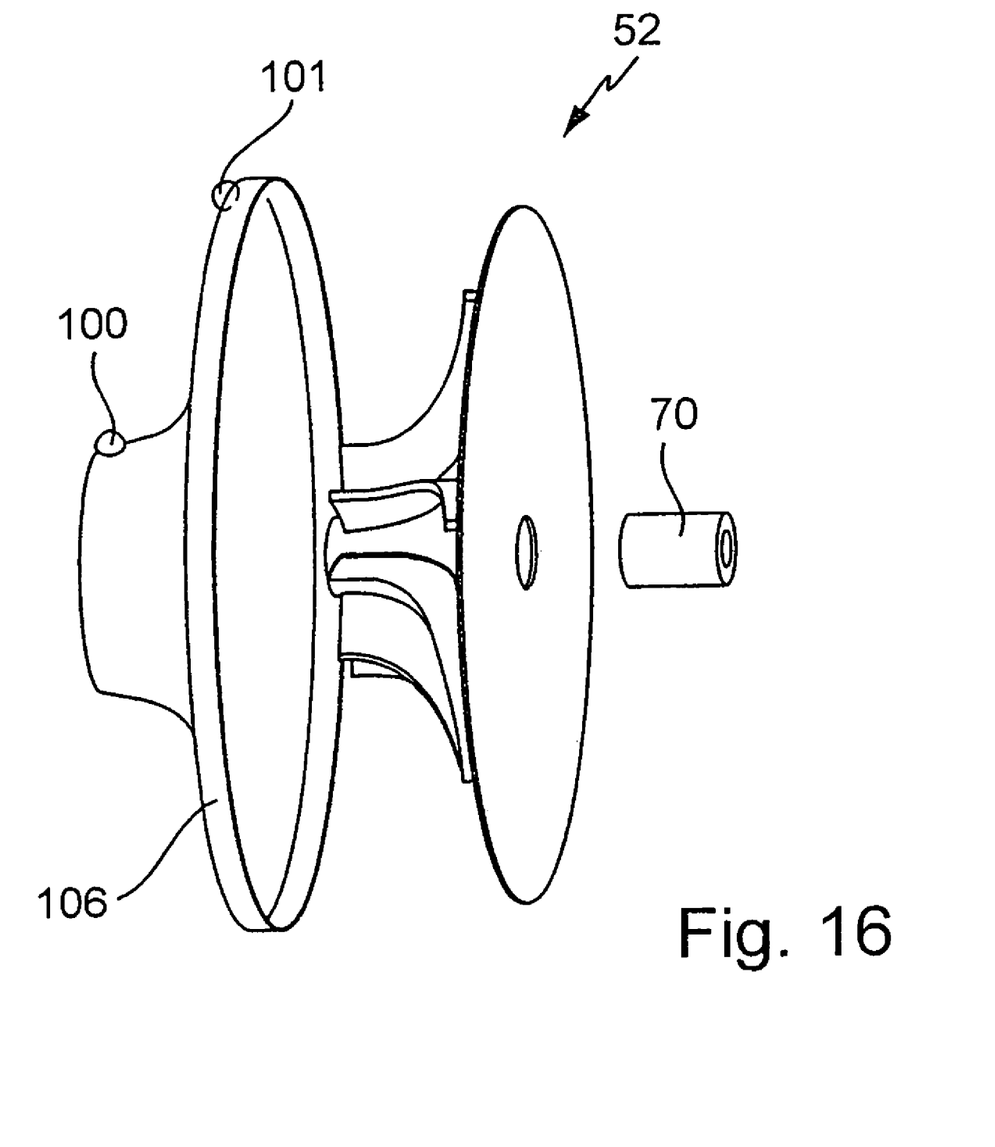
FIG. 16 shows a perspective exploded illustration of the turbine wheel according to still a further embodiment.

FIGS. 7 to 9 show the construction of the compressor wheel 53 in more detail. The types of construction described below may also be applied to the turbine wheel 52. Except for the changed shape of the blades, the turbine wheel 52 corresponds to the compressor wheel 53. The invention is therefore not restricted to the compressor wheel 53, but rather also relates to the turbine wheel 52 in the same manner. An exemplary embodiment of the turbine wheel 52 is shown in more detail in FIG. 14, which gives an exploded illustration of the turbine wheel, and in FIG. 15, which shows the assembly according to FIG. 14. FIG. 16 shows a second exemplary embodiment of the turbine wheel 52. The compressor wheel 53 (or turbine wheel 52) may have a metallic bush 70 in the axis region, this bush 70 being embedded in a preferably injection-molded impeller 71. The impeller 71 is covered by an impeller cover 72 which preferably consists of a thin metal sheet or is produced from plastic. The impeller cover 72 has a dome-shaped region 73 in which the air can flow in. The impeller cover 72 is axially displaced or set back relative to the impeller 71, so that the projecting part 74 of the impeller cover 72, in combination with an annular groove (not shown in any more detail) provided in the housing 47 of the secondary air charger 14, forms a first seal 100, e.g. in the form of a labyrinth seal. The seal 100 enables the compressor wheel 53 (or the turbine wheel 52) to be sealed off in the housing 47, so that all the air can flow into the interior of the impeller 71 without losses at the dome 73 (an outflow from the interior of the impeller 71 is correspondingly effected in the case of the turbine). In the same way, via a second seal 101, e.g. in combination with an annular groove (not shown in any more detail) in the housing 47, the air flowing radially out of the compressor wheel 53 can be sealed off, e.g. in the form of a labyrinth seal, at the radial end region of said compressor wheel 53 (correspondingly the radially inflowing exhaust gas in the case of the turbine). The first seal 100 is provided in the dome region 73 and the second seal 101 is provided in the radial end region 105 of the impeller cover 72 toward the housing and may consist of a labyrinth seal or else of a brush seal. There are advantageously only small friction forces in the case of a brush seal, so that there is only a small breakaway torque when wheel 53 or 52 is running at high speed. As FIG. 16 shows in more detail, it is also possible to provide an axially projecting margin 106 on the impeller cover 72, so that the second seal 101, e.g. in the form of a brush seal, can engage radially on the outside on the margin 106 instead of axially.

The bush 73, impeller 71 and impeller cover 72 are joined to form a unit. Suitable joining processes are, for example, adhesive bonding, encapsulation or ultrasonic welding. The compressor wheel 53 (or the turbine wheel 52) is made at least partly of plastic, preferably of polyamide and/or PEEK (polyetheretherketone, a further development of polyethersulfone) and/or PFA (perfluoro-alkoxyalkane). The plastic of the compressor wheel 53 (or of the turbine wheel 52) may in this case be designed with or without a fiber reinforcement. However, a design of the compressor wheel 53 (or of the turbine wheel 52) in a light alloy, in particular on an aluminum or magnesium basis, is also possible.

Figure 10:
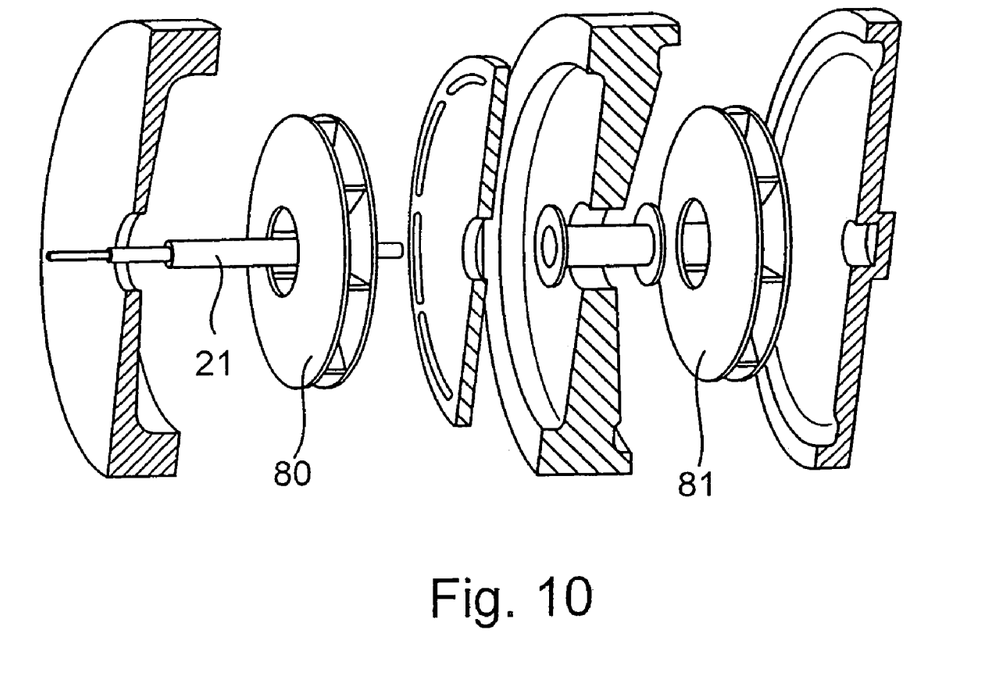
FIG. 10 shows an exploded illustration of compressor wheels according to a third exemplary embodiment of the invention.
Figure 11:
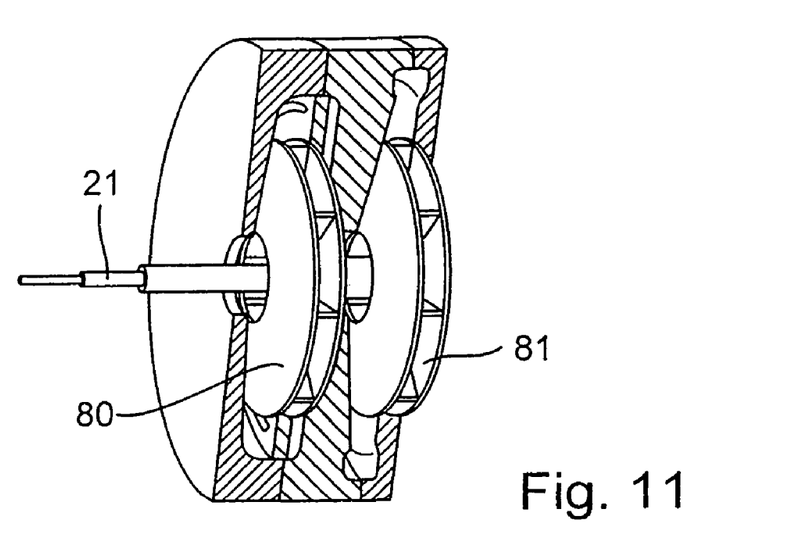
FIG. 11 shows a perspective illustration of the compressor wheels of FIG. 10.

This wheel variant has the following advantages, to be precise that critical tolerances can only occur in the region of the edges of the impeller cover 72. Furthermore, the sealing toward the housing 47 is effected essentially in the region of the air inlet or air outlet. The gap size between the housing 47 and the impeller cover 72 is uncritical, since a sealing effect by the annular groove designed as a labyrinth seal can be realized in the region of the air inlet and also in the region of the air outlet. Furthermore, effects of typical tolerances as they inevitably occur in wheels produced from plastics can be kept small by means of this construction. As an alternative to the design of the compressor wheel 53 according to FIGS. 7 to 9, it is also possible, as shown in more detail by FIGS. 10 and 11, to provide multistage, in particular two-stage, compression. In this respect, shown by way of example according to FIGS. 10 and 11 are two compressor wheels 80, 81 which are connected in series and are designed in the form of radial wheels. Both radial wheels are arranged on the same shaft 21.

Figure 12:
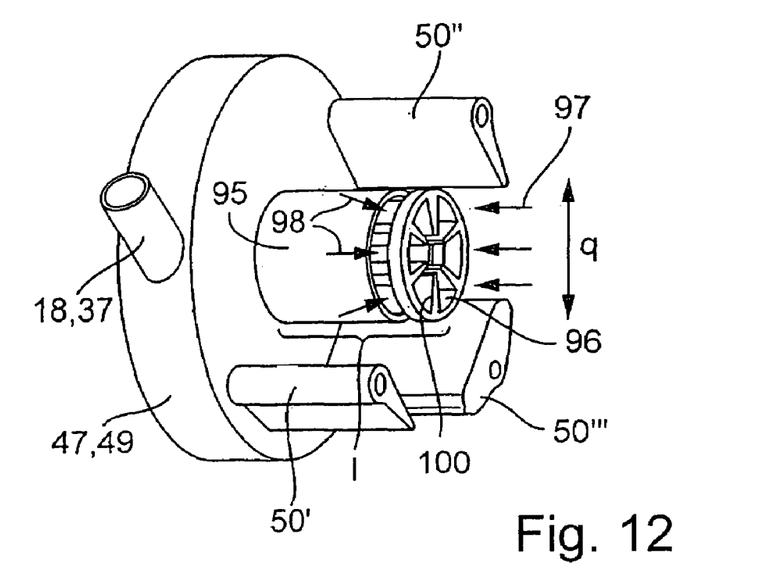
FIG. 12 shows a side element of the secondary air charger of a fourth exemplary embodiment of the invention.

FIG. 12 shows a fourth exemplary embodiment according to the invention of a side element 49 of the secondary air charger 14, in which all the components which are identical or have the same effect have been identified by the same reference numerals of the previous exemplary embodiments. The right-hand side element 48 has three side struts 50, two opposite side struts 50' and 50" serving for the insertion of the air filter element 45. The third side strut 50''' oriented transversely to the two other side struts 50', 50" serves for the latchable fastening of the air filter element 45, said third side strut 50''' having two latching lugs 90 for this purpose, which can latch the filter in place in latching grooves 66 provided (likewise shown in FIG. 6). The compressor wheel 53 is surrounded by a cylindrical or tubular element 95 which forms an inflow passage for the compressor wheel 53. In order to achieve an optimum effect of the compressor 15, the prepared air should as far as possible flow in a laminar manner through the air filter 45 in the axial direction into the compressor 15. A ratio of the inflow passage length l to inflow passage cross section q should be 3:1 or greater, preferably 5:1. This stipulation is not fulfilled in the exemplary embodiment according to FIGS. 4 and 5. The inflow passage is in this case formed from parts of the air filter cassette 45 and the struts 50, which form the housing center part. If the width of the housing center part 50 or the axial extent of the fitting space 60 and thus the length of the inflow passage are increased, a more favorable ratio is then obtained. However, this also leads to an undesirable increase in the overall length of the secondary air charger 14.

The tubular element 95 forms the inflow passage for the compressor 15 or compressor wheel 53 and is an integral part of the right-hand side element 49. In the assembled state of the side element 49, the tubular element 95 encloses the shaft 21, preferably up close to the turbine wheel 52. The shaft 21 is thus protected from damage during the insertion of the air filter element 45. At the end, on that side of the tubular element 95 which faces away from the compressor wheel 53, at least one aperture 96 is provided. A plurality of apertures 96 are preferably provided, which are recessed in a star shape radially outwardly at a lateral surface of the element 95 and are defined between radial struts 100 provided, so that, as viewed axially, there are a plurality of segments of a circle separated from one another by radial struts 100. The individual segments or slats or ribs lead to an improvement in the ratio of inflow passage length to inflow passage cross section. In addition to the axial inflow into the inflow passage (arrows 97), the apertures 96 also permit a radial inflow (arrows 98) into the inflow passage. Due to the apertures 96, it is possible to provide for a laminar air flow into the compressor 15.

Figure 13:
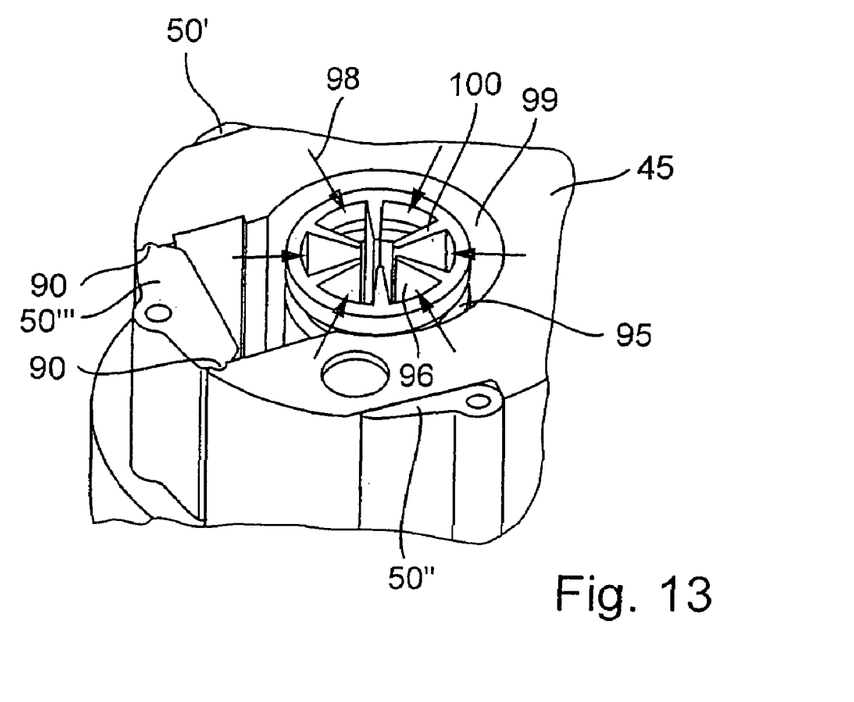
FIG. 13 shows a perspective plan view of the side element according to FIG. 12 with fitted air filter element.

As shown in greater detail by FIG. 13 in a perspective plan view of the side element 49 with the air filter element 45 installed, it is advantageous to design the air filter element 45 in such a way that a radial distance from the lateral surface of the element 95 is provided forming virtually a pre-chamber 99 for the air between the inflow passage and the apertures 96.

What is claimed is:

1. A secondary air delivery device for an internal combustion engine (10), comprising a secondary air charger (14) with a housing (47) including a compressor (15) and a turbine (16), the turbine (16) being driven ambient air flowing through the turbine (16) to an intake duct (6) as a result of a vacuum prevailing in the intake duct (6) of the internal combustion engine (10), and the turbine in turn driving the compressor (15) which delivers secondary air into the exhaust gas duct (12) of the internal combustion engine (10), said intake duct (6) including an intake air filter (4) for filtering air passing to the internal combustion engine, and a u-shaped air filter structure (45) having opposite side parts (61) provided in the secondary air charger (14) for filtering ambient air supplied to the compressor (15) and the turbine (16), said secondary air charger housing (47) including a frame structure (48, 49, 50) with side elements (48, 49) defining a fitting space (60) and the air filter structure (45) being insertable into the fitting space (60) and having grooves (66) on the opposite side parts (61) for engagement with latching lugs of the frame structure (48, 49, 50).

2. A secondary air delivery device as claimed in claim 1, wherein said air filter structure (45) comprises an air filter element (30, 31) for each of the compressor (15) and the turbine (16), via which air filter elements (30, 31) the air required by the compressor (15) and by the turbine (16) is supplied, both air filter elements (30, 31) being accommodated in a housing (47) of the secondary air charger (14).

3. A secondary air delivery device as claimed in claim 1, wherein the compressor wheel (53) of the compressor (15) and of the turbine wheel (52) of the turbine (16) have spiral blades of oppositely oriented design.

4. The secondary air delivery device as claimed in claim 1, wherein a respective groove (66) is provided on opposite side parts (61) of the air filter element (45), and a latching lug (90) correspondingly provided on a side strut (50''') of a side element (49) of the housing (47) of the secondary air charger (14) can engage in said groove (66).

5. The secondary air delivery device as claimed in claim 1, wherein the compressor in the secondary air charger (14) is a multistage compressor (FIGS. 10, 11) with a plurality of compressor wheels (80, 81) being arranged in series.

6. The secondary air delivery device as claimed in claim 1, wherein the turbine (16) is one of an axial and a radial-flow turbine.

7. The secondary air delivery device as claimed in claim 1, wherein a side element (49) of the housing (47) has a tubular element (95) which forms an inflow passage for the compressor (15) to the compressor wheel (53).

8. The secondary air delivery device as claimed in claim 7, wherein the tubular element (95) is an integral part of the side element (49) and wherein a number of apertures (96) is provided at the end of the tubular element (95).

9. The secondary air delivery device as claimed in claim 1, wherein the compressor (15) has a compressor wheel (53) with an impeller (71) which is covered by an impeller cover (72).

10. The secondary air delivery device as claimed in claim 9, wherein the compressor wheel (53) consists at least partly of plastic, comprising at least one of polyamide, PEEK and PFA.

11. The secondary air delivery device as claimed in claim 10, wherein the plastic is fiber-reinforced.

12. The secondary air delivery device as claimed in claim 9, wherein the compressor wheel (53) consists at least partly of a light alloy, including one of aluminum and magnesium.

13. The secondary air delivery device as claimed in claim 1, wherein the turbine (16) has a turbine wheel (52) which is covered by a wheel cover (36).

14. The secondary air delivery device as claimed in claim 13, wherein the turbine wheel (52) consists at least partly of plastic material including at least one of polyamide, PEEK and FFA.

15. The secondary air delivery device as claimed in claim 14, wherein the plastic material is fiber-reinforced.

16. The secondary air delivery device as claimed in claim 13, wherein the turbine wheel (52) consists at least partly of a light alloy, including one of aluminum and magnesium.

* * * * *